United States Patent [19]

West

[11] Patent Number: 4,516,162

[45] Date of Patent: May 7, 1985

[54] METHOD FOR VERIFYING SERVO DATA

[75] Inventor: David E. West, Oklahoma City, Okla.

[73] Assignee: Magnetic Peripherals Inc., Minneapolis, Minn.

[21] Appl. No.: 487,341

[22] Filed: Apr. 21, 1983

[51] Int. Cl.³ .............................................. G11B 5/02
[52] U.S. Cl. ....................................... 360/25; 360/27; 360/77; 360/31
[58] Field of Search ........................ 360/25, 27, 31, 75, 360/77, 78, 53, 60

[56] References Cited

U.S. PATENT DOCUMENTS

| 3,506,814 | 4/1970 | MacDonald et al. | 360/31 |
| 3,864,741 | 2/1975 | Schwarz | 360/77 |
| 4,214,280 | 7/1980 | Halfhill et al. | 360/53 |
| 4,285,015 | 8/1981 | Rose et al. | 360/78 |

FOREIGN PATENT DOCUMENTS

| 57-46353 | 3/1982 | Japan | 360/31 |
| 57-58212 | 4/1982 | Japan | 360/25 |

OTHER PUBLICATIONS

IBM TDB vol. 14, No. 9, "Checking the Quality of Magnetic Recording Tape", Fraim et al., 2/72, pp. 2629-2630.
YIBM TDB vol. 14, No. 9, "Total Surface Magnetic Tape Test", Barth, 2/72, pp. 2637-2638.
IBM TDB vol. 22, No. 8A, "Recording Position Signals on Record Disk", Brock et al., 1/80, pp. 3127-3130.

Primary Examiner—Raymond F. Cardillo, Jr.
Assistant Examiner—Steven R. Garland
Attorney, Agent, or Firm—Frederick W. Niebuhr; Joseph A. Genovese

[57] ABSTRACT

A method is disclosed for verifying the integrity of servo data stored as a series of parallel servo tracks on a disk. Each track includes automatic gain control data and servo positioning data. The peak amplitudes of the automatic gain control pulses on a first track determine a first effective threshold or AGC gain level. The first threshold level is then shifted to a higher, enhanced threshold level. Servo data pulses from a second track are then detected, based on the enhanced threshold level and the AGC gain level of the first track. Should these servo data pulses not be fully detected, an error is recorded for the second servo track.

8 Claims, 6 Drawing Figures

METHOD FOR VERIFYING SERVO DATA

BACKGROUND OF THE INVENTION

The invention relates to magnetic storage devices using transducers or recording heads for reading, writing and erasing data on a movable magnetic storage medium. The data are typically arranged in parallel tracks such that the transducer follows an individual track as the storage medium is moved. For example, in a rotatable disk the data are arranged in concentric tracks with the transducer radially movable with respect to the disk.

As data density increases and the space between adjacent tracks is correspondingly reduced, it becomes advantageous to record transducer positioning or servo data on the recording medium, thus permitting more accurate positioning than is possible using an entirely mechanical means. An entire disk surface can be dedicated to servo positioning data, as shown in U.S. Pat. No. 3,864,740 to Sordello et al granted Feb. 4, 1975. Alternatively, servo data can be written in sectors on the same medium containing the working data. This technique, called embedded servo and disclosed in U.S. Pat. No. 3,185,972 to Sipple, granted May 25, 1965, requires comparatively less media storage space and eliminates the need for a separate servo transducer.

Transducer positioning using servo data occurs in two stages: coarse positioning or track seeking, in which the head is directed from a random location to a selected track; and fine positioning or track following, during which the transducer, already near the selected track, is maintained in a centered position with respect to the track.

U.S. patent application Ser. No. 257,297 filed Apr. 24, 1981 (the West et. al. Application) discloses an improved servo positioning system and is incorporated by reference in this application. One of the features disclosed in the West et. al. Application is the use of automatic gain control (AGC) data in each servo track to set a threshold for recovery of coarse positioning data in the same servo track. Pulses having peak amplitudes less than the threshold value are not detected, thus to avoid an erroneous recognition of noise as coarse positioning data. The disk drive embodying this servo positioning system further utilizes improved, lighter head loading to avoid the catastrophic head crash of previous designs.

However, the lighter head support does not avoid a different problem, namely, the gradual deterioration of signal amplitudes. Such damage is difficult to detect, first because it does not readily appear upon visual inspection. Secondly, as the recovery threshold depends upon AGC data—usually it is set at fifty percent of the average AGC peak level—the threshold is reduced along with AGC and servo positioning data as they deteriorate. Thus, coarse positioning data, if degraded at the same rate as AGC data, continues to be detected due to the reduced threshold, eventually to the point of data loss due to lack of AGC dynamic range and, occasionally, media or drive failure.

Testing for errors, whether in media or drive mechanisms, is well known in magnetic data recording. U.S. Pat. No. 3,506,814 to MacDonald et. al., granted Apr. 14, 1970, shows a test tape 16 for determining, among other things, the tape drive failure point for weak signals. Characters are written in selectively reduced amplitude ranging from seventy to ten percent design amplitude. Error is indicated when the read apparatus fails to pick up a signal. Another test is disclosed in U.S. Pat. No. 3,864,741 to Shwarz, granted Feb. 4, 1975, wherein a head normally is centered between two servo tracks and thus receives two servo signals, $S_1$ and $S_2$. These signals should be equal when the head is centered, but may not be due to component errors. To determine such errors, disk 17 has an equalization sector 40 which first provides only $S_1$, then only $S_2$. Should the equalization sector signals be unequal, $S_2$ is adjusted as required.

Media testing is shown in U.S. Pat. No. 4,214,280 to Halfhill et. al., granted July 22, 1980. In a disk having data and servo sectors, a test pattern is recorded for each track. The read signal from each track activates a counter whenever its amplitude falls below a select value to indicate a defect, and the defect address is stored in memory. Subsequent write circuitry, upon sensing the defect, activates a two byte delay to prevent writing of data in the defective area.

None of these prior art methods is particularly well suited to anticipate isolated, gradual degrading of data, the problem to which the present invention is directed. It has been found that while it is possible for an entire surface to deteriorate, data tends to degrade most rapidly on a particular track and over its entire circumference. This phenomenon appears to be related to hardware malfunctions causing excessive air-system contamination or magnetic particle contaminated hardware in which the destructive effect is concentrated, by the head dwelling in the same location on the media.

It is an object of this invention, therefore, to provide an inexpensive means for verifying the integrity of servo data. It is another object of this invention to provide a means for early detection of servo signal deterioration, thus to prevent loss of data and damage to media and data reading and recording apparatus. Yet another object is to identify the nature of an impending failure in order to indicate preferred corrective measures.

SUMMARY OF THE INVENTION

To meet these and other objects, there is shown a servo system for positioning a transducer relative to a data storage medium. The storage medium has a series of parallel servo tracks recorded thereon, the data in each track including automatic gain control data and a servo data. A transducer, movable transversely of the servo tracks, is positionable proximate one of the servo tracks to generate AGC pulses when the transducer is near the AGC data on the track, and servo data pulses when it is near the corresponding servo data.

Means are provided for establishing a threshold level dependent upon the amplitudes of the AGC pulses, and pulse detecting means are provided for detecting each servo data pulse having an amplitude equal to or higher than the threshold level. A transducer guide means is provided for controlling transverse movement of the transducer responsive to servo data pulses.

Means is provided to hold a first threshold level, established from first automatic gain control pulses generated by the transducer while positioned near a first servo track, while said guide means positions the transducer proximate a second of the servo tracks to generate second servo data pulses. A threshold shift means shifts the first threshold level to an enhanced threshold level and provides the enhanced level as input to the pulse detecting means. The pulse detecting means then detects each second servo data pulse having an amplitude at least equal to the enhanced threshold level.

According to the invention, the threshold level from one servo track is held, increased, then applied to another track to test its servo data. This method is particularly well suited to detect data deterioration confined to a particular track but occurring throughout that track. Ordinarily a track with degraded AGC and coarse positioning data is not discovered since the effective threshold is reduced by AGC gain increase to enable continued pulse detection, creating the false impression of no deterioration. Tested against a higher threshold level based on a neighboring, non-degraded track, the degraded coarse positioning data is not detected as its amplitude does not meet the higher amplitude requirement. The failure to detect data results in an error signal identifying the defective track.

Another aspect of the invention is a bypass means for disabling the threshold shift means once a defect is discovered. The bypass causes the first threshold level to replace the enhanced threshold level as an input to the pulse detector, thereby permitting the detection of servo data on a degraded track so that it may be read and copied on a back-up medium.

IN THE DRAWINGS

Other features and advantages of the invention will become apparent upon reading the following detailed description and upon reference to the drawings, in which.

DETAILED DESCRIPTION OF THE PREFERRED EMBODIMENT

Figure 1:
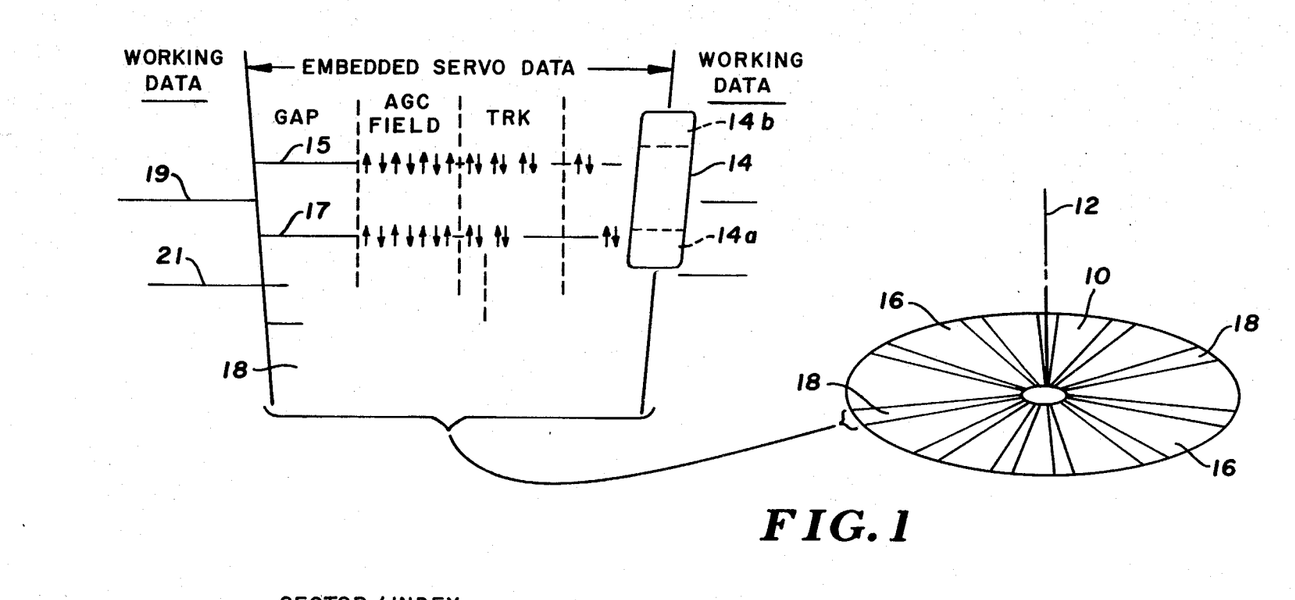
FIG. 1 is a diagrammatic representation of a magnetic disk with servo data sectors encoded thereon, with an enlarged portion of one of the servo sectors.

Referring to the drawings, there is shown in FIG. 1 a magnetic disk 10 rotatable about a central axis 12. A transducer or read/record head 14 is used for reading, writing and erasure of data on the disk as it is rotated about axis 12. Specific means for supporting disk 10 for such rotation, and mechanical means for supporting transducer 14 relative to the disk, are not shown or discussed in detail herein, as, such apparatus is well known. An example of a means for rotating a disk is shown in U.S. Pat. No. 4,224,648 to Roling, granted Sept. 23, 1980. A reference describing a means for transducer support is U.S. Pat. No. 4,089,029 to Castrodale et al, granted May 9, 1978.

Data is preferably stored on disk 10 in a series of data tracks, concentric about axis 12 and hence parallel to one another. Two general types of data are stored on disk 10. Working data, i.e. the data usable to operators, is stored in a plurality of working data sectors 16. The remainder of the disk surface area is occupied by servo data sectors 18, equal in number to the working data sectors but requiring substantially less surface area. Disk 10 preferably has thirty-two servo sectors; or, in another model, sixty-four.

The servo data encoded in sectors 18 has three purposes, all associated with the proper positioning of transducer 14 in relation to the surface of disk 10. First of all, the servo data is used for the angular or rotational alignment of the transducer. The information is further useful in radially positioning the transducer for the selection of one of the concentric data tracks, a process called coarse positioning or track seeking. Finally, the servo data is used to govern the radial position of transducer 14 for precise track following or fine servo positioning once a particular data track has been and reached by the transducer.

Servo data sectors 18 are equally spaced angularly around the surface of disk 10 and are substantially identical to one another in the sense that the sectors are equal in arcuate width and contain substantially the identical data, identically positioned within the sector.

Both servo and working data are normally encoded in the form of magnetic flux areas, the transducer being designed to generate an analog electrical signal in accordance with the pattern of magnetic flux areas on a particular track as disk 10 is rotated with transducer 14 positioned over that track. An enlarged portion of one of servo data sectors 18 is shown in FIG. 1 to illustrate such magnetic flux. Upwardly directed arrows represent magnetic flux acting in one direction, while downward arrows represent flux in the opposite direction. As seen from FIG. 1, servo data tracks 15 and 17 are radially offset from working data tracks 19 and 21, each working data track being equidistant from its two adjacent servo data tracks. During reading and recording operations, transducer 14 preferably is centered over a selected data track. Accordingly it is located between its two most adjacent servo data tracks.

For enhanced flying stability, transducer 14 includes skis 14a and 14b facing the disk surface and forming between them a groove parallel to the tracks. Such groove is shown, for example, in U.S. Pat. No. 4,167,766 to Chau granted Sept. 11, 1979. In FIG. 1, the size of head 14 relative to the tracks is reduced for clarity in illustration. Actually, the head spans twenty-two tracks, and when transducer 14 is centered over a particular track, e.g., track zero, radially inward ski 14a is over track eleven.

Under normal drive operation, there are two locations at which head 14 tends to dwell soon after head load. One is at one of the centrally located tracks, a location chosen to afford maximum tolerance so that transducer 14 is positioned within the data zone and not in either the outer or inner guard zone bordering the data zone. The other dwell location is the outermost or zero track. During dwell time, the eleventh tracks from the dwell locations (i.e., the ski locations) are beneath a ski. Localized damage, if it occurs at all, tends to occur at the ski locations. Further, while signal degradation over an entire surface is normally detectable because of an increase in read error rate, repeating read errors and seek errors, isolated track degradation is more difficult to detect as it requires access to the specific track. Signal degradation, to the point of lost data, can occur undetected by visual inspection. A scope can be used to scan every track, but such testing is complicated and time consuming.

Figure 2:
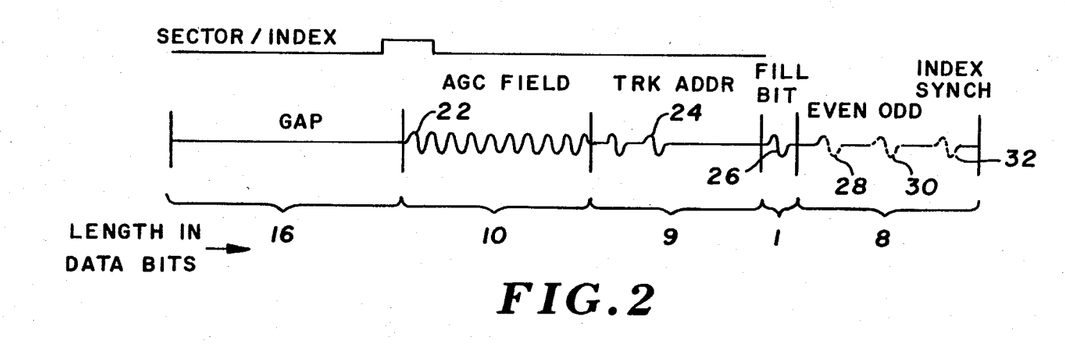
FIG. 2 shows a read signal generated by disk movement relative to a transducer.

In FIG. 2, servo data track 17 is expanded to show an analog read signal generated when transducer 14 is flying over the selected servo data track, i.e., when the transducer is over the track and disk 10 is rotating. The magnetic flux areas in FIG. 1, and correspondingly the pulses shown in FIG. 2, can be divided into four regions across sector 18; a gap in which there are no pulses, and automatic gain control (AGC) field including a synchronization pulse 22 followed by a series of alternately positive and negative pulses of substantially equal duration and absolute amplitude; a track address region containing two address dibits 24; and a fine servo region including a fill bit 26, and an even dibit 28, an odd dibit 30, and an index synchronization pulse 32. The track address and fine servo regions together form a servo data field.

Figure 3:
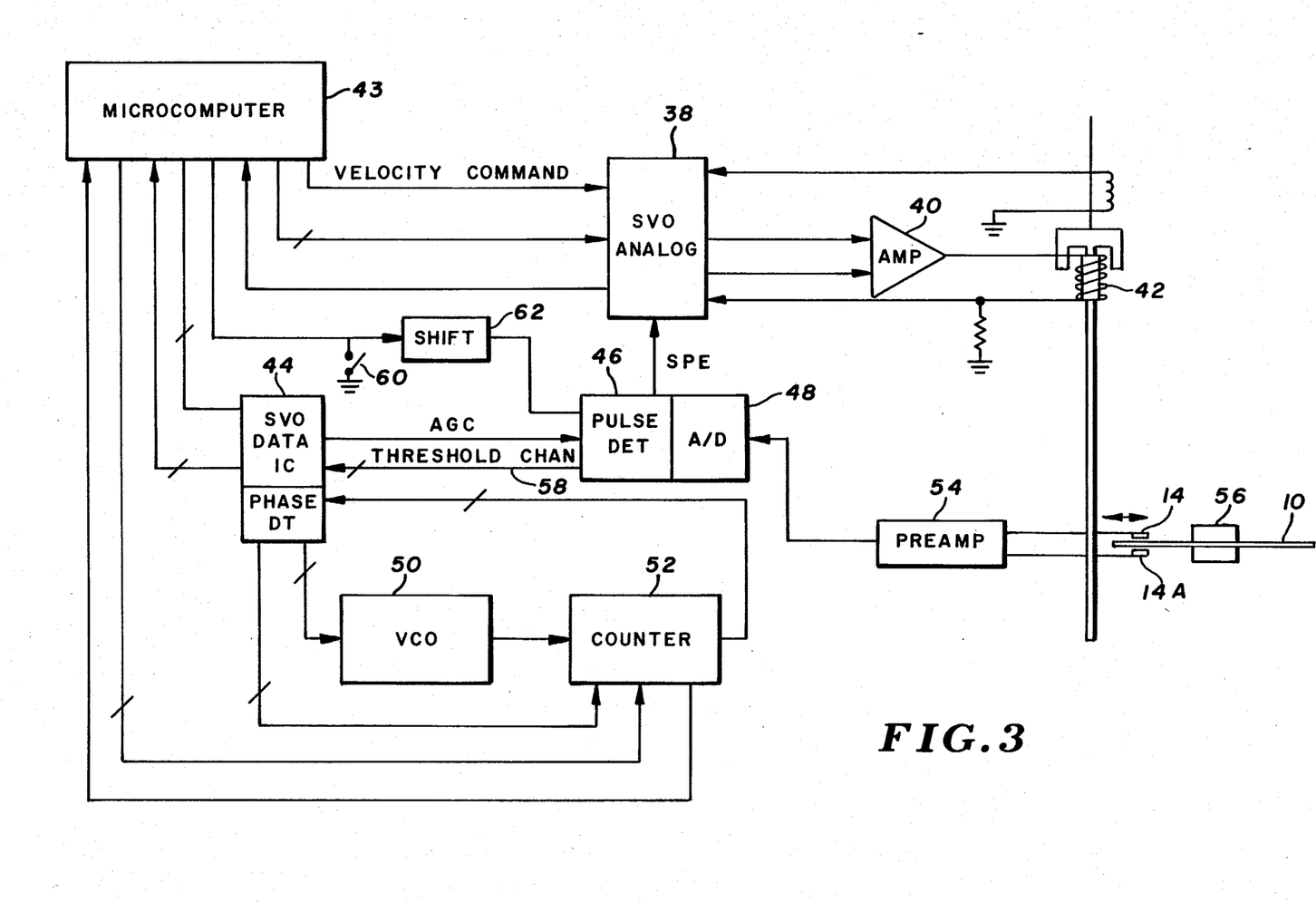
FIG. 3 is a block diagram of circuitry for guiding transducer movement responsive to the read signal.

Circuitry for controlling the position of transducer 14 in response to flux areas in sectors 18, and for verifying the data in sectors 18, includes a digital system and a servo analog system 38. The servo analog system, acting through a servo amplifier 40, supplies an analog signal to a voice coil 42 which in turn controls the radial position of transducer 14 and accompanying transducer 14A based upon the signal received from amplifier 40.

The digital circuitry includes a microcomputer 43 interfacing directly with a servo data integrated circuit 44 including a phase detector. Tying the digital and analog circuitry together is a pulse detector 46 and analog/digital convertor 48. Formed in a closed loop with circuit 44 are a voltage controlled oscillator 50 and a digital counter 52, part of circuit 44. A preamp 54 amplifies signals from heads 14 and 14A generated while disk 10 is rotated by a spindle 56. Between microcomputer 43 and pulse detector 46 are a bypass or jumper switch 60 and a threshold shift circuit 62.

Figure 4:
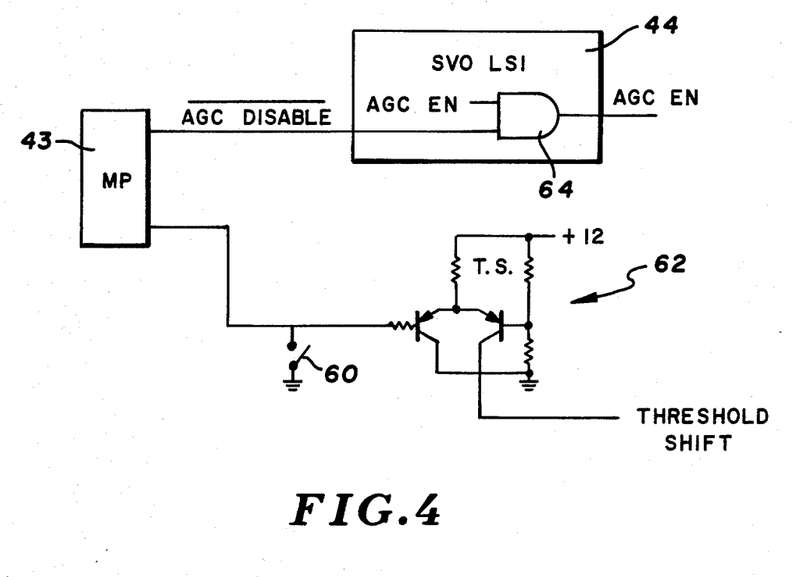
FIG. 4 is a diagram illustrating threshold shift circuitry and a portion of the servo data integrated circuit of FIG. 3.

As seen from FIG. 4, threshold shift circuit 62 receives from microcomputer 43 a high threshold signal equal to a select percentage, preferably fifty percent, of the average signal peak level of the automatic gain control pulses. The output is an upwardly shifted or enhanced threshold signal, for example, seventy percent of the AGC peak amplitude. The amount of threshold shift depends upon the voltage input shown as +12, which can be increased or reduced depending upon the desired shift. Also shown is a portion of servo data integrated circuit 44 which permits the holding of an AGC signal from one track during a seek to another track. An AND gate 64 has two inputs: AGC DISABLE, i.e. the inverse of $\overline{\text{AGC DISABLE}}$, from microcomputer 43; and AGC ENABLE, internally generated in integrated circuit 44 from counter 52. The output to pulse detector 46 is high only when both inputs are high.

The functions of initial head orientation, track seeking and track following all depend upon effective detection of pulses generated by the head. For pulse detection, the digital system includes high and low threshold channels connecting servo data integrated circuit 44 and the pulse detector. The dual channel pulse detection enables accurate gap detection during initial transducer orientation, and later permits detection of servo track address pulses with minimal interference from noise. While the referenced West et. al. Application discloses both channels, the primary concern of the present application is the high threshold channel.

Figure 5:
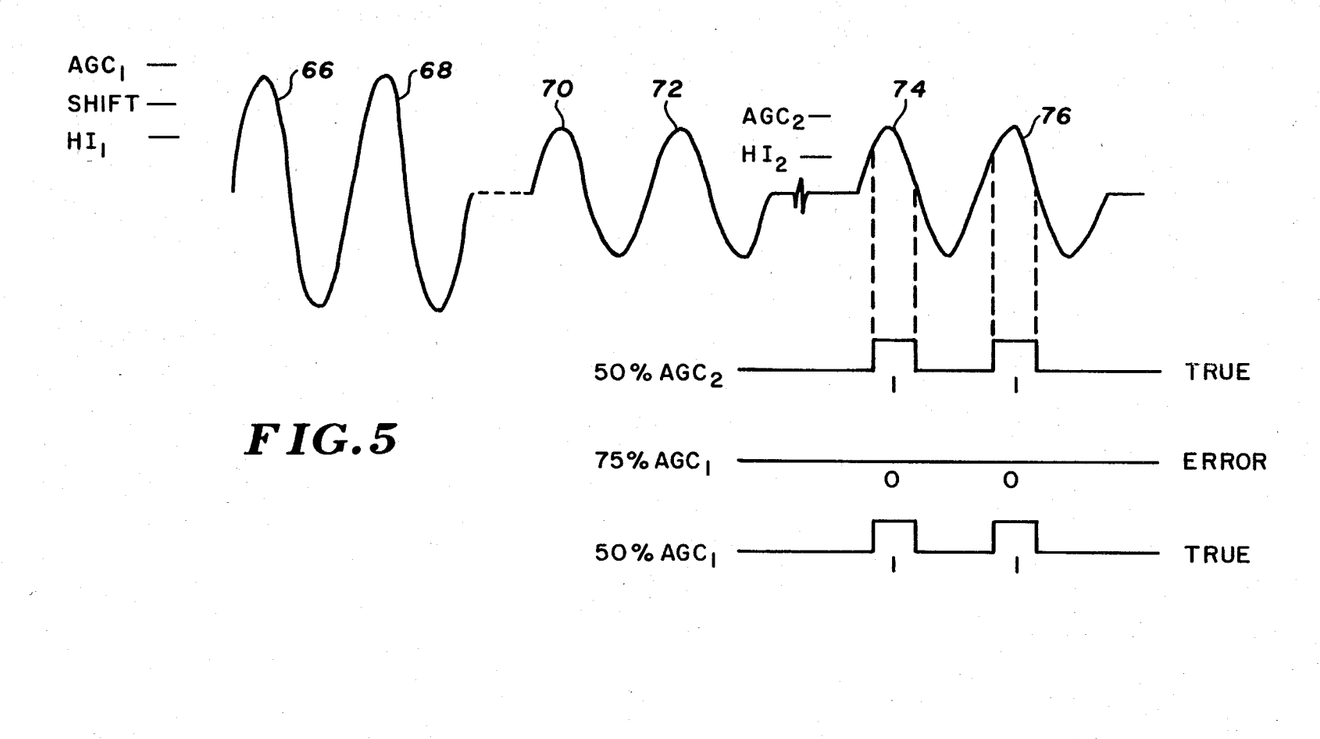
FIG. 5 is a timing diagram illustrating the threshold level hold and shift functions of the circuitry in FIG. 3.

FIG. 5 shows a composite analog signal generated by transducer 14, including doublet pulses 66, 68, 70, 74 and 76. Each doublet pulse includes a positive pulse followed immediately by a negative pulse of substantially equal amplitude. Pulses 66 and 68 are AGC pulses generated with the transducer over a servo track "X", while pulses 70 and 72, also AGC pulses, are generated with the head over a servo track "X+2" two cylinders inward from track X. Pulses 74 and 76 represent servo data on track X+2. Beneath the data pulses are three digital wave forms: 50% $AGC_2$, 75% $AGC_1$ and 50% $AGC_1$.

Pulses 70-76 can be considered alone to understand use of AGC pulses to set a high threshold signal. The AGC level for track X+2, as determined by the peak amplitudes, is shown as a horizontal line labelled "$AGC_2$" in the figure. The $HI_2$ line is the high threshold, fifty percent of the $AGC_2$ amplitude. A pulse in the servo data field of track X+2 is detected whenever its amplitude equals or exceeds the high threshold. The 50% $AGC_2$ digital wave is enabled just as each servo data pulse reaches the $HI_2$ level. The trailing edge of the 50% $AGC_2$ signal occurs at the transition or zero crossing of the analog signal. $AGC_2$ represents the read signal with $AGC_1$ gain level held. $HI_2$ is the effective threshold level if read signal $AGC_2$ is allowed to increase by AGC system to $AGC_1$ level.

The difficulty arising from gradual deterioration over a particular track is understood from a comparison of the pulses generated from track X with those generated from track X+2. The data on track X, in terms of magnetic field strength, is at or near the level at which it was written on disk 10. Consequently, the analog pulses generated by transducer 14, when it flys over track X, have relatively high peak amplitudes. More particularly, AGC pulses 66 and 68, among other AGC pulses, determine a high AGC level, shown in FIG. 5 as the horizontal line labelled $AGC_1$. The corresponding high threshold level, $HI_1$, is fifty percent of the $AGC_1$ amplitude. Threshold shift circuit 62, when operative, increases the high threshold level to an enhanced threshold level shown in the figure as SHIFT. The enhanced level is normally selected to be within the range of seventy to seventy-five percent of AGC.

Returning to pulses 70-76, their reduced amplitudes show degradation of the servo data in track X+2. As previously mentioned, such damage may leave no visible trace on disk 10. AGC pulses 70 and 72, along with the remaining AGC pulses from track X+2, determine an automatic gain control level $AGC_2$ which is, for example, only sixty percent of $AGC_1$, the level from track X. Reduced high threshold $HI_2$ is one-half of $AGC_2$, hence only thirty percent of $AGC_1$, and thus servo data on track X+2, when tested on the basis of threshold $HI_2$, will be detected although it may have an amplitude of only thirty percent of normal AGC. Two problems can arise from such deterioration of track X+2. First, pulse amplitudes may be reduced to the point that the transducer 14 can no longer read the data due to a lack of dynamic range of the AGC system. Alternatively, noise may be misread as data since false signals generated by the "reading" of noise approach the amplitude of genuine data. Data is lost in either case.

In many instances, gradual deterioration of a single track could be discovered by sufficiently frequent, track by track inspection with an oscilloscope. Such a method is cumbersome and expensive, and is avoided in accordance with the present invention, comprising a brief, inexpensive test performed automatically during head load. Two basic principles underly the test. First, sudden changes in track to track servo amplitudes are sought by establishing a high threshold based upon one track and applying such threshold to another track.

Second, the high threshold is increased to an enhanced or failsafe level, enabling data from a degraded track to be copied on a back-up disk after its identification as amplitude-deteriorated data.

Orientation of the transducer with respect to the disk surface includes first establishing the angular position, then locking oscillator 50 with respect to disk 10. An index synchronization bit 32 is provided in but one of sectors 18 for establishing rotational position. When transducer 14 first encounters the index mark, it generates a signal enabling a sector counter which indicates when, based on the speed of disk rotation, the index mark should be again encountered. If the actual second encounter and the sector counter indication of the index marker coincide, the sector counter is locked and subsequent index pulses are ignored. This requirement for two consecutive valid index synchronization signals substantially eliminates the possibility of a false index. Furthermore, the lock at the second valid index signal permits the system to handle a false synch signal.

Following indexing, voltage controlled oscillator 50 is synchronized rotationally with embedded servo sectors 18. The establishment of VCO position depends upon the detection of a gap in read signal 20. The gap in each servo sector is a predetermined length, 16 bit times as seen in FIG. 2, over which there are no magnetic flux areas. Accordingly, transducer 14 generates no analog pulses during the first 16 bit times of each servo data sector 18. This absence of pulses is detected by the low threshold channel as there is no pulse during the gap time that has an amplitude sufficient to exceed the low amplitude threshold. The voltage controlled oscillator and servo sectors are synchronized at the transition or zero crossing of the fist pulse in the automatic gain control region of the sector, i.e., synchronization bit 22. Ideally, a lock occurs after the first gap sensed. However, should oscillator 50 be slightly out of phase, a current pump provides a pump-down signal when counter 52 indicates that VCO 50 is leading sector rotation. If a counter indicates that the VCO is trailing sector rotation, a pump-up signal is applied. A further protection against a false synchronization is the requirement for the sensing of two consecutive synchronization bits in two successive sectors 18. The maximum error for the second synchronization bit is plus or minus 16 servo clocks or approximately 800 ns, approximately 0.3 percent of the total bit time from one servo data sector to the next. Once locked, VCO 50 generates a selected number of clock cycles between successive servo data sectors.

After VCO lock, a track address generated by head 14 is received by pulse detector 46 and is sent to servo data integrated circuit 44 as a digital representation, which circuit 44 converts into a sequential digital address representative of the particular track's position in the track sequence, and this digital address in turn is sent to microcomputer 43. The microprocessor uses this digital address for coarse positioning.

Figure 6:
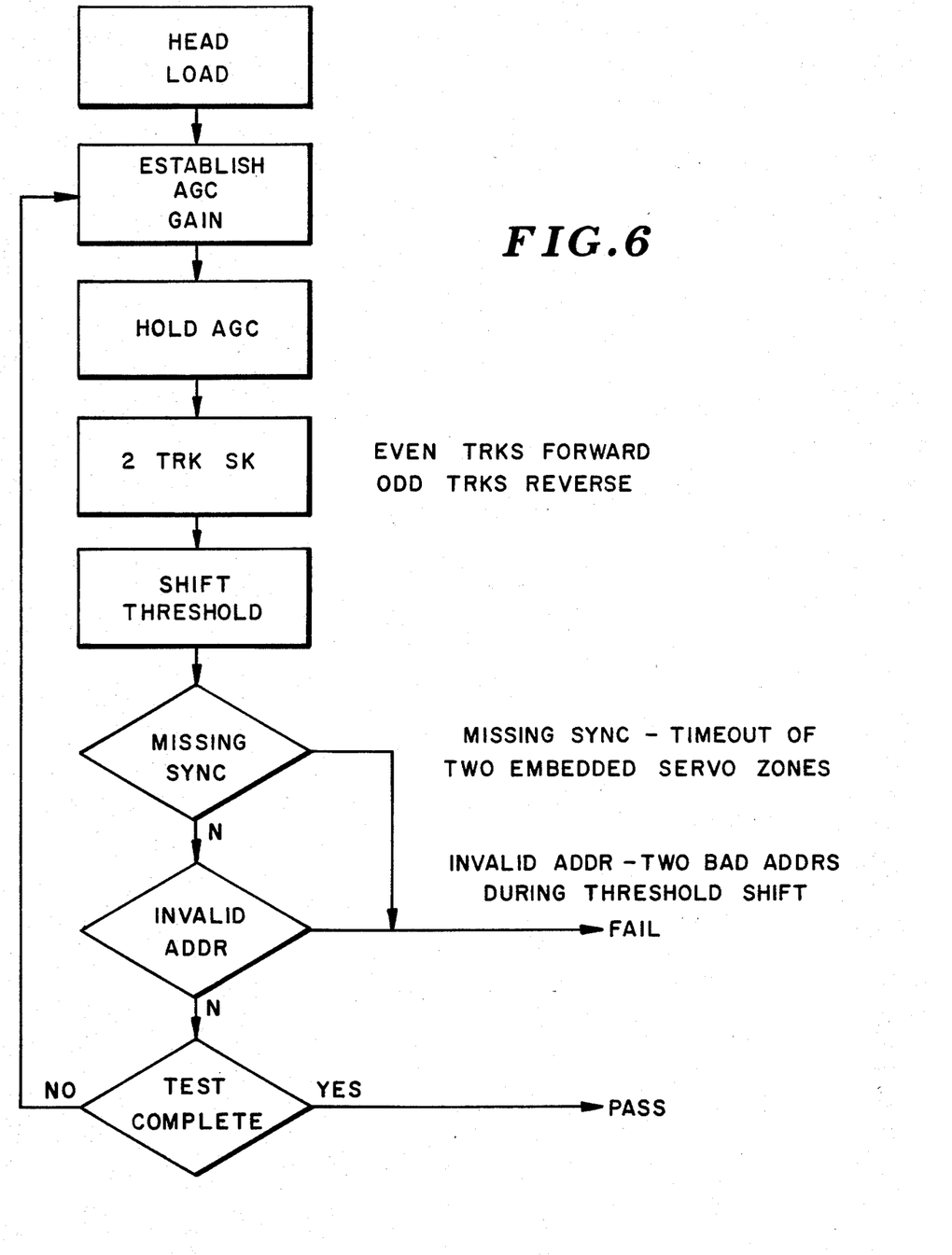
FIG. 6 is a flow chart illustrating servo data validation using the circuitry in FIG. 3.

The preceding sequence operates to position transducer 14 and allow subsequent coarse positioning, despite encountering an isolated track having degraded data. This is because, as explained in connection with FIG. 5, the AGC data, which sets the standard for track address data recovery, is reduced in amplitude along with the address data. A method of testing for isolated amplitude-reduced tracks is best understood from the flow chart in FIG. 6. The head load stage includes the initial index and VCO lock described above. A first track is selected for initiating the test, and transducer 14 is positioned proximate the first track to generate a read signal including automatic gain control pulses based on the AGC data on the first track, thus causing microcomputer 43 to establish a first threshold level of approximately one-half the average peak amplitude of the AGC data pulses. Referring to FIG. 5, given track X as the first track, the first threshold level is $HI_1$.

In the absence of the test, servo data pulses generated from track X would be detected based on the $HI_1$ threshold. Pursuant to the test, $HI_1$ instead is held while transducer 14 is positioned proximate a second track—specifically, track $X+2$. The $AGC_1$ level is held by microcomputer 43 which disables the $\overline{\text{AGC DISABLE}}$ signal. By virtue of AND gate 64, the AGC ENABLE output from servo data integrated circuit 44 is disabled. Thus, $HI_2$, the threshold level based on the AGC pulses generated from track $X+2$, is not provided as an input to pulse detector 46.

An alternative input to the pulse detector is provided through threshold shift circuitry 62. First, threshold level $HI_1$ from microcomputer 43 is provided as input to the threshold shift circuitry. The output of circuitry 62 is an enhanced first threshold level, higher than the first threshold level and lower than the average peak amplitude of the AGC data pulses from the first track. The enhanced first threshold level, shown as SHIFT in FIG. 5, is preferably seventy to seventy-five percent of the average AGC level.

Data on the second track is then detected based upon the enhanced first threshold level. The initial servo data to be detected are synchronization bits 22. A synchronization bit immediately follows the sixteen bit time gap in each servo sector 18, and thus should be detected as each servo sector passes transducer 14. Should two consecutive servo sectors pass without detection of a synchronization bit, error is indicated. Microcomputer 43 stores the track address and the nature of the failure, in this case "missing sync". In two-sided recording, the particular head or surface is identified as well. If synchronization pulses 22 are detected, the track address field in each servo sector is tested, again based upon the enhanced first threshold level. Should the track address data from two of servo sectors 18 go undetected or be detected only in part, error is indicated and microcomputer 43 retains the address and nature of the fault, in this case "invalid address".

If the second track passes both the missing sync and invalid address tests, its servo data is deemed valid. The AGC DISABLE signal is enabled so that a new threshold level is established, now based upon the AGC data on the second track. The new level is held while transducer 14 is placed over a third track, threshold shifted and applied to pulse detector 46 for testing the third track. The cycle is repeated until all required servo tracks have been tested. Upon completion of the test with no failures, the servo data can be used to position head 14 for routine reading and writing operations. The threshold circuitry is not used during such operations, and address data in each servo track is detected using AGC data in the same track.

A specific sequence is particularly well suited for locating isolated, degraded tracks with the above described test. Transducer 14 is first positioned over outermost servo track zero. During AGC hold, the transducer is moved according to a two-track seek, two cylinders radially inward to servo track two. This pattern of two-track seek and test is continued until all even-numbered tracks are tested. When transducer 14 has tested the most radially inward even numbered track, its movement is reversed to test the odd numbered tracks. In this manner every track is tested.

While the above sequence is preferred, the separation between tested tracks can vary within the general concept disclosed. For particular drives or media, sequential testing of every track may be required, while in another case, perhaps every fifth track should be tested. Each track may be tested completely or over only a partial rotation of disk 10. Finally, the amplitude of the enhanced first threshold can be increased or reduced, depending upon the amount of data degradation to be tolerated before a failure is indicated. Generally, the enhanced threshold level should be sufficiently above the first threshold level such that deterioration is recognized long before the data becomes difficult to read.

Once degraded data is identified, it is desirable to retrieve such data before it is lost, for example by copying it on a back-up disk. Bypass switch 60 is used for this purpose, as best understood in connection with FIGS. 4 and 5. Servo data pulses 74 and 76, having amplitudes less than that of SHIFT (75% $AGC_1$), are not detected and thus the 75% $AGC_1$ digital wave form registers an error. Pulses 74 and 76 cannot be recovered so long as they are tested with SHIFT. To reduce the threshold, bypass switch 60 is closed, causing pulses 74 and 76 to be tested according to $HI_1$ rather than SHIFT. As shown in the 50% $AGC_1$ waveform, the lower threshold allows recovery of pulses 74 and 76 and the data they represent is not lost.

Thus is disclosed an inexpensive and reliable method of validating servo data on a magnetic medium. The method permits early identification and recovery of degrading data, and further enables detection of a faulty disk surface before it can cause damage to the drive. The track at which failure occurs and the nature of the failure also are identified. Finally, means are provided for detecting data not detectable using the enhanced threshold so that such data can be recovered by copying it on a back up medium.

What is claimed is:

1. A servo system for positioning a transducer with respect to a data storage medium including:
   a moveable storage medium having a series of parallel servo tracks recorded thereon, the data in each track including automatic gain control data and servo data;
   a transducer moveable transversely of said servo tracks and positionable proximate any one of said servo tracks to generate automatic gain control pulses while near the automatic gain control data, and servo data pulses while near the servo data;
   means for establishing a first threshold level dependent upon the peak amplitudes of said automatic gain control pulses;
   pulse detecting means for detecting each of said servo data pulses having an amplitude at least as high as that of said threshold level; and
   a transducer guide means for controlling the movement of said transducer responsive to said servo data pulses;
   wherein the improvement comprises:
   means for holding the first threshold level, established from first automatic gain control pulses generated by said transducer while positioned near a first of said servo tracks, while said guide means positions said transducer proximate a second of said servo tracks to generate second servo data pulses; and
   threshold shift means, having as an input thereto said first threshold level, for generating an enhanced threshold level dependent upon and higher than said first threshold level, and further for providing said enhanced threshold level as an input to said pulse detecting means whereby said pulse detecting means detects each of said second servo data pulses having an amplitude at least as high as said enhanced threshold level.

2. The servo system of claim 1 wherein:
said first threshold level is substantially equal to one-half of the average peak amplitude of the first automatic gain control pulses.

3. The servo system of claim 2 wherein:
said enhanced threshold level is substantially equal to 70% of the average peak amplitude of said first automatic gain control pulses.

4. The servo system of claim 1 further including:
bypass means for disabling said threshold shift means whereby said pulse detecting means detects each of said second servo data pulses having an amplitude at least as high as that of said first threshold level.

5. The servo system of claim 1 including:
means for indicating an error whenever said pulse detecting means fails to detect said second servo data pulses.

6. A method for verifying the integrity of servo data stored as a series of parallel servo tracks on a data storage medium, each track including automatic gain control data and servo data, said method comprising the steps of:
   a. generating first automatic gain control pulses dependent upon the automatic gain control data on a first servo track;
   b. establishing a first threshold level dependent upon the peak amplitudes of said first automatic gain control pulses;
   c. shifting said first threshold level to an enhanced threshold level having an amplitude higher than that of said first threshold level;
   d. generating second servo data pulses dependent upon the servo data on a second servo track; and
   e. detecting each of said second servo data pulses having an amplitude at least as high as that of said enhanced threshold level.

7. The method of claim 6 including:
the step of identifying said second servo track as in error in the event that said second servo data pulses are not detected.

8. The method of claim 6 including the further step of repeating steps a–e for other servo tracks on said data storage medium until a selected number of said servo tracks have been verified.

* * * * *